(12) United States Patent
Litvin et al.

(10) Patent No.: US 9,031,113 B2
(45) Date of Patent: May 12, 2015

(54) RESONATOR WITH INTRACAVITY TRANSFORMATION OF A GAUSSIAN INTO A TOP-HAT BEAM

(75) Inventors: Ihar Anatolievich Litvin, Brummeria (ZA); Andrew Forbes, Brummeria (ZA)

(73) Assignee: CSIR, Pretoria (ZA)

( * ) Notice: Subject to any disclaimer, the term of this patent is extended or adjusted under 35 U.S.C. 154(b) by 321 days.

(21) Appl. No.: 13/266,078

(22) PCT Filed: Apr. 29, 2010

(86) PCT No.: PCT/IB2010/051880

§ 371 (c)(1),
(2), (4) Date: Oct. 24, 2011

(87) PCT Pub. No.: WO2010/125534

PCT Pub. Date: Nov. 4, 2010

(65) Prior Publication Data

US 2012/0039351 A1 Feb. 16, 2012

(30) Foreign Application Priority Data

Apr. 30, 2009 (ZA) ................................ 2009/03012

(51) Int. Cl.
*H01S 3/08* (2006.01)
*H01S 3/106* (2006.01)

(52) U.S. Cl.
CPC ............... *H01S 3/08045* (2013.01); *H01S 3/08* (2013.01); *H01S 3/106* (2013.01); *H01S 2301/206* (2013.01)

(58) Field of Classification Search
CPC ... H01S 3/0057; H01S 2301/18; H01S 5/005; H01S 3/08045; H01S 3/0812; H01S 3/1055; H01S 2301/20; H01S 2301/206; H01S 3/13

USPC .................. 372/92, 96, 99, 101, 102; 359/559
See application file for complete search history.

(56) References Cited

U.S. PATENT DOCUMENTS

| 5,151,917 | A |   | 9/1992 | Perilloux et al. |
| 5,430,748 | A | * | 7/1995 | MacCormack et al. .. 372/29.016 |
| 5,454,004 | A | * | 9/1995 | Leger ............................... 372/99 |
| 5,745,511 | A | * | 4/1998 | Leger ............................... 372/19 |
| 6,134,259 | A | * | 10/2000 | Danziger et al. ................. 372/99 |

(Continued)

OTHER PUBLICATIONS

M Tondusson, et al. "Coherent combination of four laser beams in a multi-axis Fourier cavity using a diffractive optical element" 2001 J. Opt. A: Pure Appl. Opt. 3 pp. 521-526.*

(Continued)

*Primary Examiner* — Colleen A Matthews
*Assistant Examiner* — Delma R Forde
(74) *Attorney, Agent, or Firm* — McCarter & English, LLP; David R. Burns

(57) ABSTRACT

The invention relates to an optical resonator, laser apparatus and a method of generating a laser beam inside an optical resonator. The optical resonator (100) includes an optical cavity (102) and an optical element (104.1, 104.2) at either end thereof, operable to sustain a light beam (108) therein, characterized in that each optical element (104.1, 104.2) is a phase-only optical element operable to alter a mode of the beam (108) as it propagates along the length of the optical resonator (100), such that in use the beam (108) at one end of the optical resonator (100) has a Gaussian profile while the beam (108) at the other end of the optical resonator (100) has a non-Gaussian profile.

8 Claims, 7 Drawing Sheets

(56) References Cited

U.S. PATENT DOCUMENTS

| | | | |
|---|---|---|---|
| 6,385,229 B1* | 5/2002 | Hiiro | 372/101 |
| 6,813,286 B1 | 11/2004 | Danziger et al. | |
| 7,813,407 B2* | 10/2010 | Petersen et al. | 372/103 |
| 2002/0154672 A1* | 10/2002 | Friesem et al. | 372/92 |
| 2004/0136433 A1* | 7/2004 | Kuznetsov | 372/92 |
| 2007/0153866 A1* | 7/2007 | Shchegrov et al. | 372/50.124 |

OTHER PUBLICATIONS

Ram Oron, "Discontinuous phase elements for transverse mode selection in laser resonators" Applied Physics Letters vol. 74, No. 10 Mar. 8, 1999, pp. 1373-1375.*

International Search Report issued in International Application No. PCT/IB2010/051880, dated Jul. 16, 2010.

Written Opinion issued in International Application No. PCT/IB2010/051880.

International Preliminary Report on Patentability issued in International Application No. PCT/IB2010/051880, dated Aug. 16, 2011.

Dickey et al, "Laser Beam Shaping: Theory and Techniques", Marcel Dekker, 2000, pp. 73-154.

Pare et al., "Custom Laser Resonaters Using Graded-Phase Mirrors," IEEE Journal Quantum Electronics, Jan. 1992, vol. 28. No. 1, p. 355-362.

Litvin et al. "Gaussian mode selection with intracavity diffractive optics," Optics Letters, Oct. 1, 2009, vol. 34, No. 19, p. 2991-2993.

Litvin et al, "Intra-cavity flat-top beam generation," Optics Express, Aug. 31, 2009, vol. 17, No. 18, p. 15891-15903.

Hoffnagle et al, Design and Performance of a Refractive Optical System that Converts a Gaussian to a Flattop Beam, Applied Optics, Oct. 20, 2000, vol. 39, No. 30, pp. 5488-5499.

Romero et al., "Lossless Laser Beam Shaping," Journal Optical Society America, Apr. 1996, vol. 13, No. 4, pp. 751-760.

Belanger et al., "Optical Resonators Using Graded-phase Mirrors," Optics Letters, Jul. 15, 1991, vol. 16, No. 14, pp. 1057-1059.

* cited by examiner

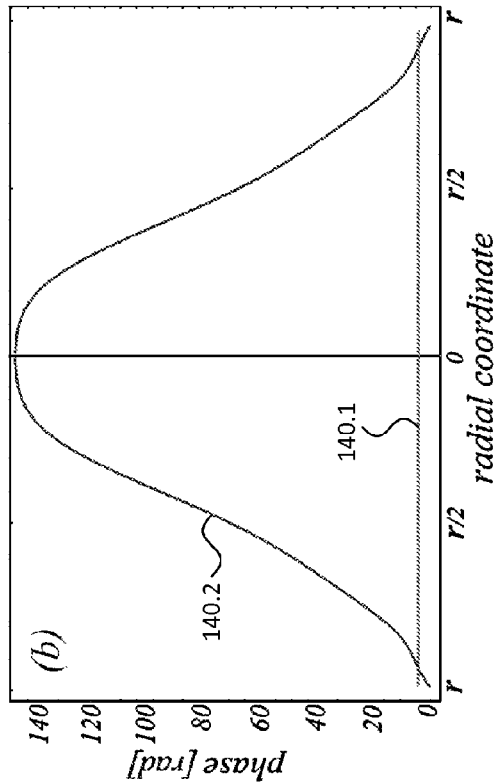
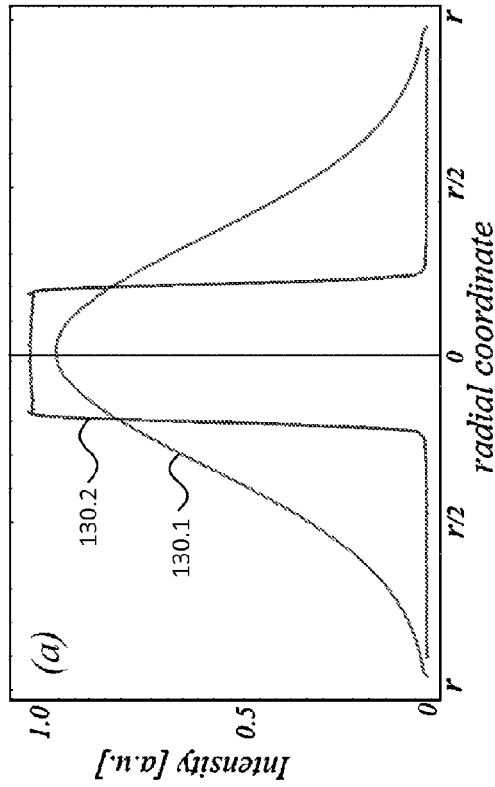
FIG 3
FIG 4

RESONATOR WITH INTRACAVITY TRANSFORMATION OF A GAUSSIAN INTO A TOP-HAT BEAM

RELATED APPLICATIONS

This application is a 35 U.S.C. §371 national stage filing of International Application No. PCT/IB2010/051880, filed on Apr. 29, 2010 and claims the benefit of ZA Patent Application No.: 2009/03012, filed on Apr. 30, 2009. The entire contents of each of the foregoing applications are incorporated herein by reference.

FIELD OF INVENTION

This invention relates generally to optics and specifically to an optical resonator, laser apparatus and a method of generating a laser beam inside an optical resonator.

BACKGROUND OF INVENTION

In optics, and specifically lasers, a Gaussian beam is a beam of electromagnetic radiation having a transverse electrical field which is described by a Gaussian function. The Inventors are aware of the present practice of generating a Gaussian beam in an optical resonator of a laser apparatus by suppressing or filtering higher order modes to leave only the lowest (or fundamental) order mode of the optical resonator. The suppressing of the higher order modes necessarily introduces a loss into the laser. Accordingly, a Gaussian beam is generated at the expense of energy.

Typically, amplitude elements rather than phase elements are used to suppress the higher order Hermite-Gaussian and Laguerre-Gaussian modes because all of the modes in the optical resonator have the same phase and differ only by a constant.

Lasers which emit Gaussian beams are sought after for many applications. Thus, on account of the thermal losses of such lasers, laser manufacturers offer either lower energy lasers or lasers which are pumped very hard to compensate for the losses. Such pumping of the lasers can introduce other problems, such as thermal problems.

The Inventors desire a lossless or low loss laser capable of emitting a Gaussian beam by the use of phase-only optical elements.

The Inventors are also aware that there are many applications where a laser beam with an intensity profile that is as flat as possible is desirable, particularly in laser materials processing. Flat-top-like beams (FTBs) may include super-Gaussian beams of high order, Fermi-Dirac beams, top-hat beams and flat-top beams. Such beams have the characteristic of a sharp intensity gradient at the edges of the beam with a nearly constant intensity in the central region of the beam, resembling a top-hat profile.

The methods of producing such flat-top-like beams can be divided into two classes, namely extra- and intra-cavity beam shaping. Extra-cavity (external) beam shaping can be achieved by manipulating the output beam from a laser with suitably chosen amplitude and/or phase elements, and has been extensively reviewed to date [1]. Unfortunately, amplitude beam shaping results in unavoidable losses, while reshaping the beam by phase-only elements suffers from sensitivity to environmental perturbations, and is very dependent on the incoming field parameters.

The second method of producing such beam intensity profiles, intra-cavity beam shaping, is based on generating a FTB directly as the cavity output mode. There are advantages to this, not the least of which is the potential for higher energy extraction from the laser due to a larger mode volume, as well as an output field that can be changed in size by conventional imaging without the need for special optics in the delivery path. Unfortunately, such laser beams are not solutions to the eigenmode equations of optical resonators with spherical curvature mirrors, and thus cannot be achieved (at least not as a single mode) from conventional optical resonator designs.

The key problem is how to calculate the required non-spherical curvature mirrors of the resonator in order to obtain a desired output field. One method to do this is to reverse propagate the desired field at the output coupler side of the resonator to the opposite mirror, and then calculate a suitable mirror surface that will create a conjugate field to propagate back. This will ensure that the desired field is resonant. This method was first proposed by Belanger and Pare [2-4], and is further referred to as the reverse propagation technique. It was shown that the intra-cavity element could be defined such that a particular field distribution would be the lowest loss mode, opening the way to intra-cavity beam shaping by so-called graded-phase mirrors. This principle has been applied to solid state lasers [5], and extended by inclusion of an additional internal phase plate for improving the discrimination of undesired higher order modes [6]. However, in general this approach does not lead to closed form solutions for the required mirror phases.

The Inventors also aim to find an approach which yields simple expressions for calculating the mirror surfaces. This approach is contrasted with the reverse propagating technique for calculating suitable graded-phase mirrors.

SUMMARY OF INVENTION

According to one aspect of the invention, there is provided an optical resonator including an optical cavity and an optical element at either end thereof, operable to sustain a light beam therein, characterised in that:

each optical element is a phase-only optical element operable to alter a mode of the beam as it propagates along the length of the optical resonator, such that in use the beam at one end of the optical resonator has a Gaussian profile while the beam at the other end of the optical resonator has a non-Gaussian profile.

The non-Gaussian profile may be in the form of a flat-top-like profile (or near-flat-top profile).

Phase-only optical elements may include diffractive optical elements (DOEs), graded-phase mirrors, digital optics, kinoform optics, and aspheric elements.

The phase-only optical element may operate in either transmission or reflection mode, and may be a diffractive optical element (DOE). The phase-only elements are henceforth referred to as DOEs.

The DOE may have a non-spherical curvature. Such a non-spherical DOE may discriminate against those modes which do not have the correct field distribution.

The DOE at the Gaussian end may include a Fourier transforming lens and a transmission DOE. In such case, the resonator length may be selected to match the focal length of the Fourier transforming lens ($L=f$). In the case of a FTB/Gaussian beam combination, the FTB beam may be generated only at the Fourier plane of the lens.

In one dimension, an effective phase profile of the DOE at the Gaussian end, may be given in one dimension by:

$$\phi_{DOE_1}(x) = i\left(\phi_{SF}(x) - \frac{kx^2}{2f}\right),$$

where the second term is the required Fourier transforming lens.

In addition to an exact function for the phase of the DOE at the Gaussian end, the stationary phase method may be used to extract a closed form solution for the phase of the DOE at the non-Gaussian/FTB end in one dimension as:

$$\phi_{DOE_2}(x) = -\left[\frac{k}{2f}x^2 + \frac{1}{2}\beta\exp(-\zeta^2(x))\right],$$

where $$\zeta(x) = Inv\left\{\mathrm{erf}\left(\frac{2x}{w_{FTB}\sqrt{\pi}}\right)\right\}.$$

A more exact result for the phase function at the non-Gaussian/FTB end may be calculated by propagating the initial field at the Gaussian end using suitable laser beam propagation techniques, e.g. the wave propagation equation in the Fresnel approximation.

In two dimensions, an effective phase profile of the DOE at the Gaussian end, may be given in one dimension by:

$$\phi_{DOE_1}(\rho) = \phi_{SF}(\rho) - \frac{k\rho^2}{2f}.$$

It is to be appreciated that the phase of the DOE ($\phi_{DOE}$) is a functional form of a DOE mimicking a Fourier transforming lens and a phase only transmission element ($\phi_{SF}$). The phase function may be determined using the stationary phase method:

$$\phi_{SF}(\rho) = \beta\frac{\sqrt{\pi}}{2}\int_0^{\frac{\rho}{w_0}}\sqrt{1 - \exp(-\xi^2)}\,d\xi.$$

Similarly, the stationary phase method may be used to extract a closed form solution for the phase of the DOE at the non-Gaussian/FTB end:

$$\phi_{DOE_2}(r) = \arg\left\{\exp\left[i\left(\frac{k}{2f}r^2 + \phi_{SF}(\rho(r)) - \frac{\beta r\rho(r)}{w_{FTB}w_0}\right)\right]\right\}.$$

This is further described below.

The optical resonator may include a gain medium located within the optical cavity. The gain medium may be arranged more towards one end of the optical resonator, e.g. longitudinally eccentrically. The gain medium may be arranged towards the end where the beam in use has the non-Gaussian profile (further referred to as the non-Gaussian end). If the non-Gaussian profile is a flat-top profile, the intensity of the beam may be distributed in use generally radially evenly within the gain medium. This even radial distribution may result in enhanced thermal characteristics of the gain medium in use compared against those of a non-even radial distribution.

The optical resonator may include an output coupling at the end of the optical cavity where the beam in use has the Gaussian profile (further referred to as the Gaussian end) and/or at the non-Gaussian end, thereby to produce an output beam having the Gaussian profile and/or the FTB profile.

The invention extends to a laser apparatus which includes:
an optical resonator as defined above; and
associated drive and control circuitry to operate the optical resonator.

According to another aspect of the invention, there is provided a method of generating a laser beam inside an optical resonator having an optical element at either end thereof, the method including:
providing each optical element in the form of a phase-only optical element; and
altering a mode of the beam, by means of the optical elements, as it propagates along the length of the optical resonator, such that in use the beam at one end of the optical resonator has a Gaussian profile while the beam at the other end of the optical resonator has a non-Gaussian profile.

It will thus be understood that the method employs a phase technique and occurs within the optical resonator and is thus primarily an intra-cavity method.

The non-Gaussian profile may be a flat-top-like profile.

The method may include locating a gain medium longitudinally eccentrically towards the non-Gaussian end.

Providing phase-only optical elements may include providing diffractive optical elements (DOEs) having a non-spherical curvature. In such case, the method may include discriminating against those modes which do not have the correct field distribution.

The method may include providing a DOE in the form of a Fourier transforming lens and a transmission DOE at the Gaussian end. The method may then include selecting the resonator length to match the focal length of the Fourier transforming lens (L=f). The Gaussian beam may be generated only at the Fourier plane of the lens.

In addition to an exact function for the phase of the DOE at the Gaussian end, the stationary phase method may be used to extract a closed form solution for the phase of the DOE at the non-Gaussian/FTB end.

BRIEF DESCRIPTION OF DRAWINGS

The invention will now be further described, by way of example, with reference to the accompanying diagrammatic drawings.

In the drawings:

FIG. 3 shows a graph of calculated beam intensities of respective opposite ends of a laser beam generated by the optical resonator of FIG. 1;

FIG. 4 shows a graph of calculated beam phases of respective opposite ends of a laser beam generated by the optical resonator of FIG. 1;

DETAILED DESCRIPTION OF EXAMPLE EMBODIMENTS

Figure 1:
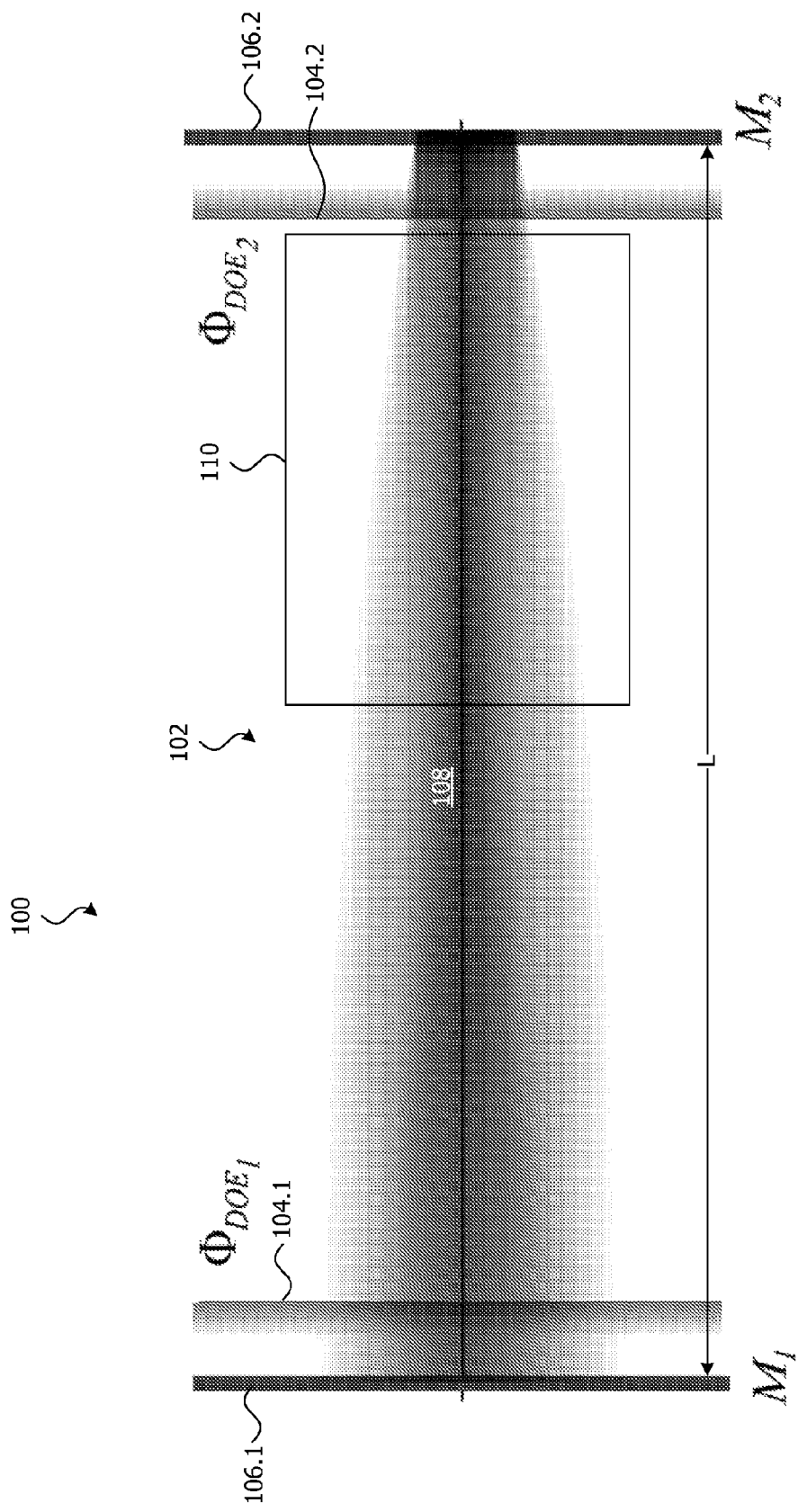
FIG. 1 shows a schematic view of an optical resonator, in accordance with the invention.

FIG. 1 shows a schematic view of an optical resonator, in accordance with the invention, generally indicated by reference 100. The optical resonator 100 has an optical cavity 102 which includes optical elements at either end thereof. More particularly, each end of the optical resonator includes a phase-only diffractive optical element (DOE) 104.1, 104.2 operating in transmission mode coupled with, or at least in line with, a reflective element, i.e. a mirror 106.1, 106.2. A laser beam generated in accordance with the invention is generally indicated by reference numeral 108.

One Dimensional Example

In this example, the optical resonator 100 has the following parameters used to illustrate the approach to Gaussian beam and flat-top beam generation: wavelength of $\lambda=1064$ nm; optical path length between the mirrors 106.1, 106.2 of $L=300$ mm and an output flat-top beam of width $w_{FTB}=4$ mm. These parameters have been chosen by way of example only, but can be considered realistic for experimental verification. The round trip modal build up and losses were studied numerically using the Fox-Li approach [7], by applying a fast matrix method to simplify the calculations and improve accuracy for an allowable computation time.

The theory outlined below, as well as the numerical simulations thereof, is restricted to the problem of one dimensional laser beam shaping, simply to keep the mathematical analysis as simple as possible. The two dimensional beam shaping problem has the same conceptual base, and the results may readily be extended to additional dimensions (see the two dimensional example below).

By way of further background, the reverse propagation technique will first be outlined, first proposed by Belanger and Pare [2, 3], since it will be used as a point of comparison for the laser and method in accordance with the invention.

An arbitrary field may be written in the form:

$$u(x) = \psi(x)\exp[-ik\phi(x)], \quad (1)$$

where $k=2\pi/\lambda$ is the wavenumber, $\lambda$ is the wavelength, and $\psi(x)$ and $\phi(x)$ are the amplitude and phase of the electric field respectively. The action of a DOE in the form of a phase-only mirror (e.g. graded-phase mirror) is to transform the phase $\phi_{in}(x)$ of an incoming field to a new phase $\phi_{out}(x)$ of an outgoing field according to:

$$\phi_{out}(x) = \phi_{in}(x) - 2\phi_{DOE}(x). \quad (2)$$

The salient point here is that this transformation takes place in a lossless manner, i.e., the amplitude is unchanged, $\psi_{in}(x) = \psi_{out}(x)$. In particular, one can show [2] that if the phase mirror is not spherical, then the change in phase also depends on the incoming field distribution $\psi_{in}(x)$. Thus, it is expected that such a phase-only mirror will discriminate against those modes that do not have the correct distribution $\psi_{in}(x)$. By invoking the requirement that the mode must reproduce itself after one round trip, and considering the impact of the graded-phase mirror on the curvature of the wavefront, it has been shown that the resulting restriction on the phase of the DOE mirror is given by [2]:

$$\int_{-\infty}^{\infty} x\left(\frac{\partial \phi_{in}}{\partial x}\right)\psi_{in}^2(x)dx = \int_{-\infty}^{\infty} x\left(\frac{\partial \phi_{DOE}}{\partial x}\right)\psi_{in}^2(x)dx, \quad (3)$$

from which it can be concluded that the phase of the resonator eigenmode is the same as the phase of the DOE mirror, apart from a constant:

$$\phi_{DOE}(x) = \phi_{in}(x) - \phi_{in}(0). \quad (4)$$

Combining Equations (2) and (4), and ignoring the constant phase offset, $$\phi_{out}(x) = -\phi_{in}(x). \quad (5)$$

Therefore, the reflected beam $u_{out}(x)$ is the phase-conjugate of the incoming beam, $u_{out}(x) = u_{in}^*(x)$. In this optical resonator, only a particular beam distribution is phase conjugated by the DOE mirror, so that the eigenmode of the resonator satisfies the criteria that its wavefront matches the phase of each mirror in the cavity.

If the desired field at the output coupler end (mirror $M_2$) is described as $u_2$, then reverse propagating the field to the DOE mirror ($M_1$) using the Huygen's integral in the Kirchhoff-Fresnel approximation yields the field at mirror $M_1$ as $$u_1(x_1, L) = \sqrt{\frac{i}{\lambda L}} \int_{-\infty}^{\infty} u_2(x_2)\exp\left(-\frac{i\pi}{\lambda L}(x_1^2 - 2x_1 x_2 + x_2^2)\right)dx_2, \quad (6)$$

where L is the optical path length of the resonator. If, after refection off mirror $M_1$, the field $u_1$ is to reproduce $u_2$ at the output coupler, then the required phase for the DOE at mirror $M_1$ must be given by $$\phi_{DOE_1} = \text{phase}[u_1^*(x,L)]. \quad (7)$$

The argument can also be made heuristically to reach the same conclusion: one of the main properties of a fundamental mode of optical resonator is that the path of propagation both in the forward and in the reverse direction must repeat on one another. Consequently, in order to obtain a fundamental mode of a desired intensity profile, a way must be found to force the electromagnetic wave to follow exactly the same path in the forward and the reverse propagation directions. The conjugate of an incoming wave will produce an outgoing wave with exactly this property. Consequently, it is required that:

$$\exp(i\phi_{out}(x)) = \exp(-i\phi_{in}(x)) = \exp(-i2\phi_{DOE}(x))\exp(i\phi_{in}(x)), \quad (8a)$$

and hence $$\phi_{DOE}(x) = \phi_{in}(x), \quad (8b)$$

which is consistent with Equations (4) and (5). This is the basis by which custom resonators may be designed.

In accordance with the invention, a Gaussian field is defined at mirror $M_1$ 106.1 of the form $u_i(x) = \exp(-(x/w_g)^2)$, where $w_g$ is the radius of the beam where the field is at $1/e$ of its peak value. If the DOE 104.1 at mirror $M_1$ 106.1 is made up of a Fourier transforming lens and a transmission DOE and the resonator length is selected to match the focal length of the Fourier transforming lens (L=f), then the resulting field at mirror $M_2$ will be given by:

$$u(x_2, f) = \sqrt{\frac{i}{\lambda f}} \int_{-\infty}^{\infty} u_1(x_1) \quad (9)$$

$$\exp\left[-i\left(\phi_{SF}(x_1) - \frac{ikx_1^2}{2f}\right)\right] \times \exp\left(-\frac{i\pi}{\lambda f}(x_1^2 - 2x_1 x_2 + x_2^2)\right) dx_1.$$

The method of stationary phase may be applied to find an analytical solution for the phase function of the DOE 106.2, $\phi_{SF}$, such that the field $u_2$ is a perfect flat-top beam, of width $w_{FTB}$. This may be expressed as [12]:

$$\phi_{SF}(x) = \beta\left\{\frac{\sqrt{\pi}}{2}\frac{\sqrt{2}\,x}{w_g}\operatorname{erf}\left(\frac{\sqrt{2}\,x}{w_g}\right) + \frac{1}{2}\exp\left(-\left[\frac{\sqrt{2}\,x}{w_g}\right]^2\right) - \frac{1}{2}\right\}, \quad (10)$$

where a dimensionless parameter β has been introduced, defined as $$\beta = \frac{2\pi w_g w_{FTB}}{f\lambda}. \quad (11)$$

This parameter has particular significance: at high values (β>30) the geometrical approximations hold valid, and a perfect flat-top beam may be produced with relative ease. At very low values (β<10), the geometrical approximations fail and the quality of the flat-top beam becomes less perfect.

There is a fundamental lower limit for β at which the beam shaping problem is intractable [12]. Since the flat-top beam is generated only at the Fourier plane of the lens, the effective phase profile of the DOE 104.1 at mirror $M_1$ 106.1 mimicking both the lens and this element is given by:

$$\phi_{DOE_1}(x) = i\left(\phi_{SF}(x) - \frac{kx^2}{2f}\right), \quad (12)$$

where the second term is the required Fourier transforming lens. In addition to an exact function for the phase of the first DOE 104.1, the stationary phase method may be used to extract a closed form solution for the phase of the DOE 104.2 at mirror $M_2$ 106.2 as $$\phi_{DOE_2}(x) = -\left[\frac{k}{2f}x^2 + \frac{1}{2}\beta\exp(-\zeta^2(x))\right], \quad (13a)$$

where $$\zeta(x) = \operatorname{Inv}\left\{\operatorname{erf}\left(\frac{2x}{w_{FTB}\sqrt{\pi}}\right)\right\}. \quad (13b)$$

Figure 2:
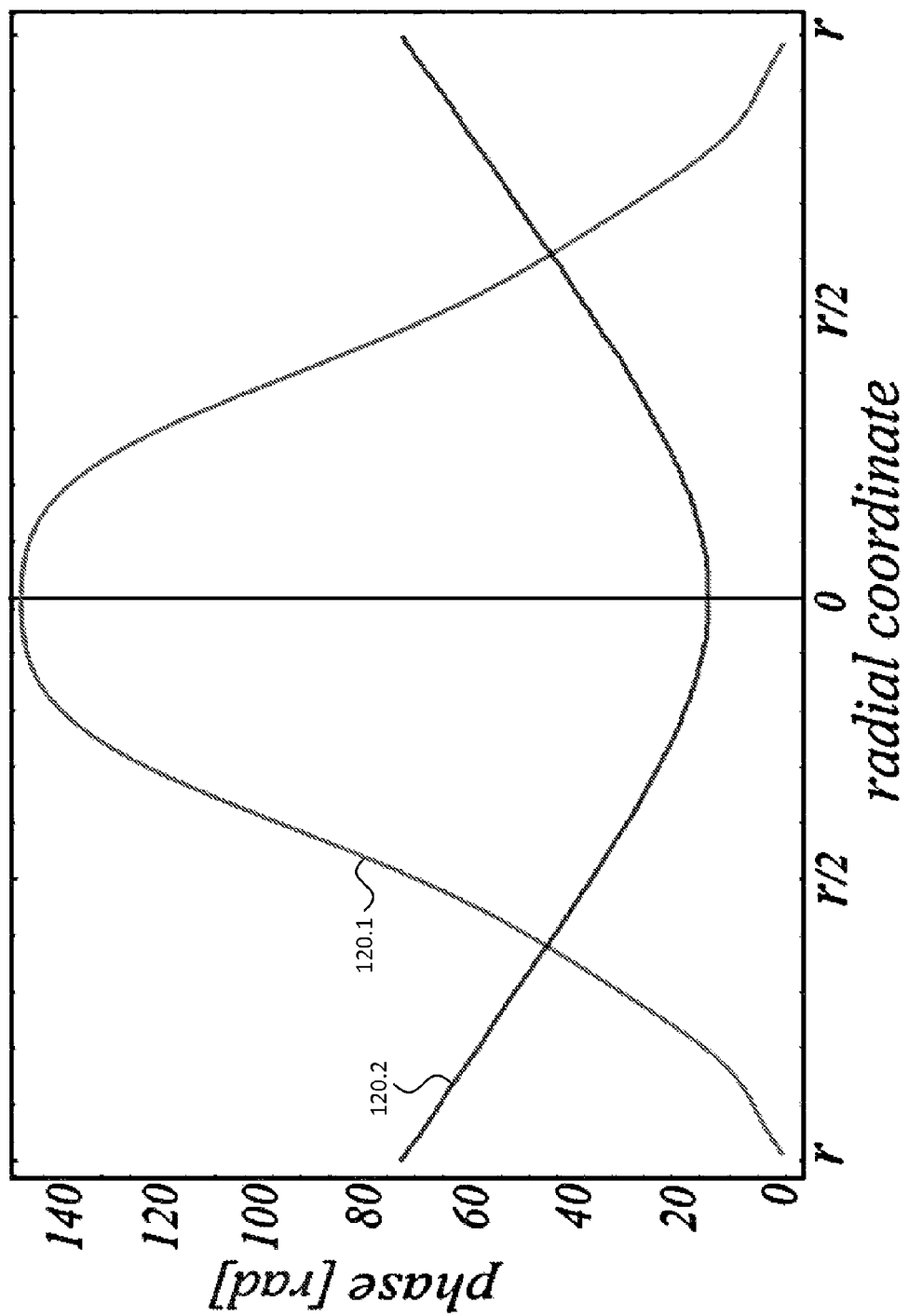
FIG. 2 shows a graph of phases of respective DOEs of the optical resonator of FIG. 1.

Here, Inv{·} is the inverse function. Such a mirror will reproduce the Gaussian field at mirror $M_1$ 106.1, as desired. The required phases of the two DOEs 104.1, 106.2 to generate a flat-top beam of width $w_{FTB}$=4 mm are shown in FIG. 2.

An important aspect of the field in this beam 108 is its metamorphosis from a Gaussian beam at mirror $M_1$ 106.1, into a flat-top beam at mirror $M_2$ 106.2; thus, while the example is presented in terms of the generation of a flat-top beam, there are advantages in exploiting the same concept for the phase-only selection of a Gaussian output mode [14].

The calculated beam intensities at each mirror 106.1, 106.2, using β~79 with $w_{FTB}$=4 mm and $w_g$=1 mm, are shown in FIG. 3 by lines 130.1, 130.2 respectively. The calculated phase of the field at each mirror 106.1, 106.2 is shown in FIG. 4 by lines 140.1, 140.2 respectively.

If desired, the gain medium, schematically indicated by reference numeral 110, may be located near the non-Gaussian side.

The simulated results represent the field after stability using the Fox-Li approach, starting from random noise. In this case, a Gaussian beam is produced at $M_1$ 106.1 and a flat-top beam at $M_2$ 106.2. The Gaussian field (just in front of $M_1$ 106.1) has a planar wavefront, while the flat-top beam (just in front of $M_2$ 106.2) does not.

Figure 5:
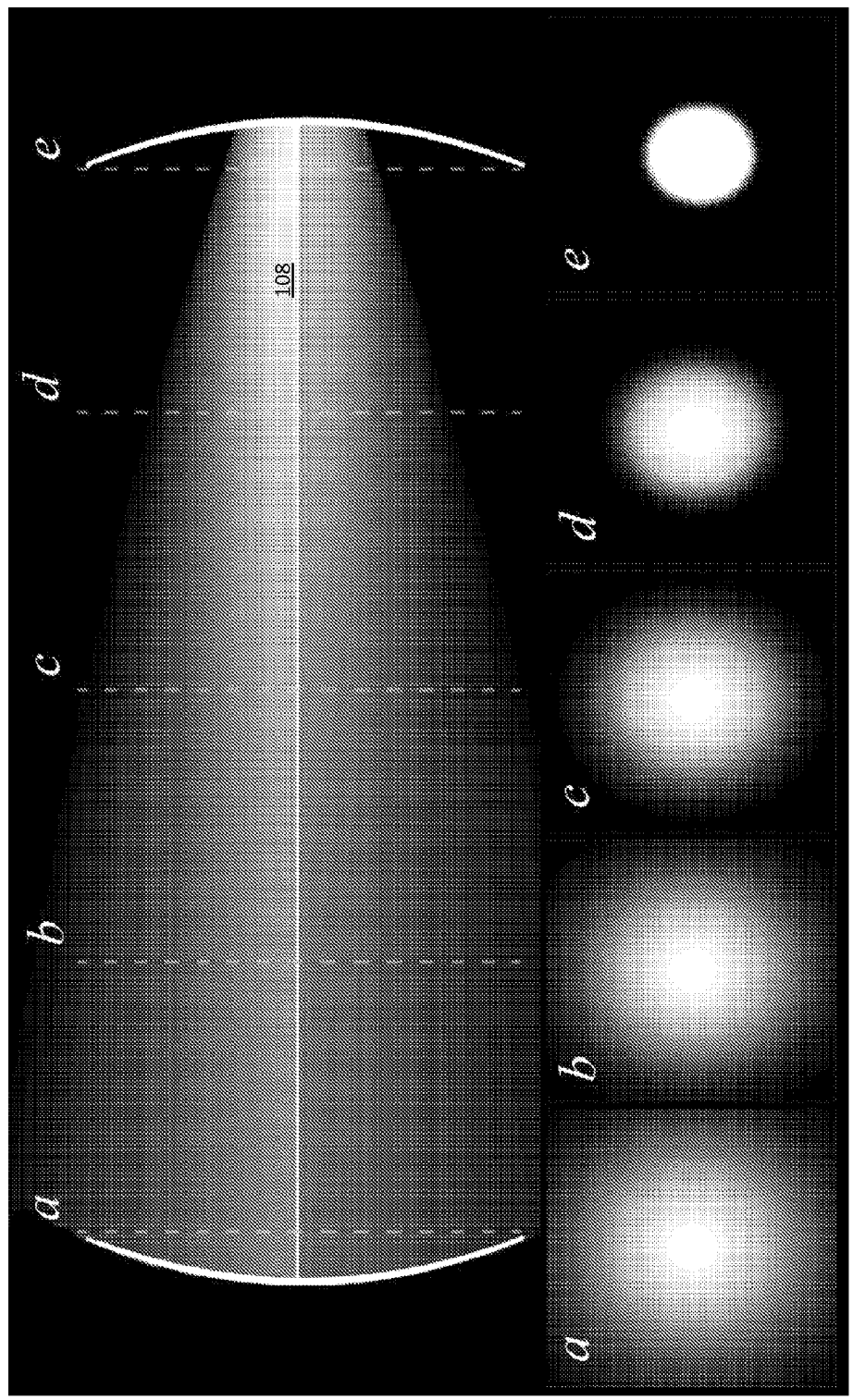
FIG. 5 shows a schematic view of a plurality of cross-sectional profiles of a laser beam generated by the optical resonator of FIG. 1.

A cross-section through the optical cavity 102 of the stabilised beam 108 is shown in FIG. 5, together with density plots of the beam or field intensity at various planes spaced axially along the optical cavity 102.

Because of the transformation during propagation from a Gaussian to a flat-top beam, a region of constant intensity is limited to near the mirror $M_2$ 106.2. This impacts on energy that may be extracted from such an optical resonator 102 since the gain volume would be somewhere between a single mode Gaussian and a single mode flat-top beam. The phase of the field at $M_2$ 106.2 requires that a suitable DOE (not illustrated) external to the optical cavity 102 be used to convert the phase of the flat-top beam into a planar wavefront, should this be required.

Figure 6:
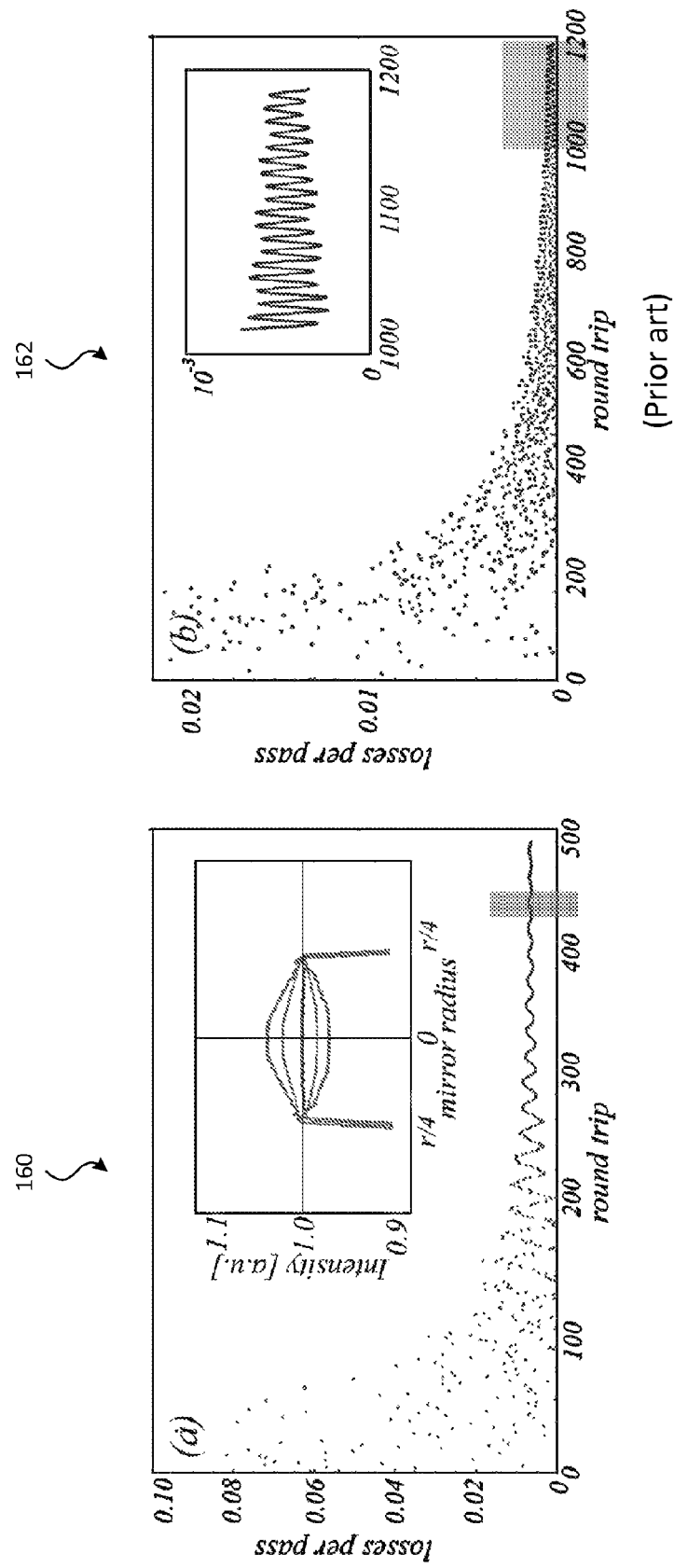
FIG. 6 shows a schematic view of a graph indicating simulated losses as a starting field of random noise propagated through the optical resonator in accordance with the invention and a laser in accordance with the prior art, respectively.

To illustrate the features and advantages of the invention, a comparison may be drawn between the optical resonator in accordance with the invention and that in accordance with the prior art. Referring to FIG. 6, a first difference lies in the dynamics of the round trip losses. The losses are higher after mode stabilisation in the optical resonator 100 and method of generating a laser beam inside an optical resonator in accordance with the invention (indicated by reference numeral 160), as compared to the prior art Belanger and Pare approach (indicated by reference numeral 162), but this in turn results in faster convergence to the fundamental mode of this optical resonator 100 in accordance with the invention. In the optical resonator 100, the mode stabilises in less then half the number of round trips required for stabilisation in the comparative conjugating resonator 162. The higher losses of the optical resonator 100 may be explained by the fact that the Gaussian field on mirror $M_1$ 106.1 in the optical resonator 100 has necessarily higher losses than is the case of a near flat-top beam on the same mirror in the laser of the prior art.

It is evident in both resonators that the losses per round trip oscillate prior to stabilising. This has been noted previously in other resonator types, and explained in terms of the stability parameters of the resonator [15]. The oscillating modes corresponding to the loss oscillations are shown in FIG. 6 as insets. Here, the field changes from a concave flat-top, through a perfect flat-top, to a convex flat-top.

Both resonators generate the same size flat-top beam at the output coupler end, but the prior art resonator (of graph 162) by its nature maintains almost the same field profile throughout its length. This would not be the case if the optical path length was much greater than the Rayleigh length of the field, but then it has already been pointed out that this resonator concept does not work at such distance as all modes have nearly spherical wavefronts, making mode discrimination weak [3].

In contrast, by design the optical resonator 100 in accordance with the invention changes the mode very rapidly between mirrors 106.1, 106.2, and thus does not suffer from this drawback. The price to pay is in the mode volume: the optical resonator 100 has a larger mode volume, and potentially would be able to extract more energy from the gain region.

Furthermore, in the case of the prior art resonator, if the gain medium is to be placed such that only a flat-top beam passes through it, then it must be restricted in size and placed near the output coupler. Both designs have restrictions on the size and quality of flat-top beam that may be generated. While in theory the design method for prior art resonator would allow any size and quality FGB to be generated, if the Rayleigh range is not large compared to the resonator length, and the Fresnel number of the resonator is not large enough, then losses will increase and the quality of the flat-top profile will deteriorate in a concomitant manner. There is thus a lower limit for the Rayleigh range to ensure a quality flat-top beam. The prior art resonator is restricted to beam sizes such that β is large (β≥30), since for small β the quality of the flat-top beam becomes poor, with large skirt regions and rounded central regions, while below a threshold value (typically β<4) the method breaks down completely and can no longer be applied.

Thus, again there is a lower limit, this time for β, so ensure a quality flat-top beam. In addition, the Fresnel number of the resonator in both options must be suitably large in order to avoid diffractive losses and associated profile distortions, and thus this too places a limit on what may be achieved. Thus one must be judicious in the choice the dimensions of the resonator in relation to the desired fields. For example, an N=100 field will ensure an excellent flat-top beam, but this will require a large resonator length and/or large mirrors in order to ensure both the Rayleigh range of the field and the Fresnel number of the resonator are both suitably large.

A final point of departure is the cost and complexity of implementing the resonator concepts. The prior art resonator requires only one DOE, and creates a planar wavefront top-hat-like beam at the planar output coupler side. In contrast, the optical resonator 100 in accordance with the invention has DOEs 104.1, 104.2 at both ends thereof, and does not produce a planar wavefront at the flat-top beam end. Thus, at least one additional DOE is required external to the cavity to create the same field in phase as in the prior art resonator. However, the major advantage of the optical resonator 100 in accordance with the invention is the ability to generate a planar wavefront Gaussian field as an output by low loss phase-only mode selection.

In practice, if the desired phase of the DOE is given by $\phi_{DOE}$, then this may either be implemented as an etched height structure in a transmission element (of refractive index n), or a reflective mirror, with associated surface feature profiles given by $$h = \frac{\lambda \phi_{DOE}}{2\pi(n-1)} \text{ and } h = \frac{\lambda \phi_{DOE}}{2\pi}$$

respectively.

Two Dimensional Example

The following example is described with reference to two dimensions, but the inventive principles are the same or similar as for one dimension. Thus, there is some repetition with respect to the one dimensional example.

Traditionally laser beams are generated in Fabry-Perot type resonators, where the mirror surfaces are spherical. When the resonator is chosen to be stable, a low-loss fundamental mode may be forced to oscillate by suitable choice of internal aperture. However, the power loss discrimination between the low order modes is often poor, and the small beam waist results in poor power extraction. Conversely, if an unstable configuration is employed, the mode volume is large and mode discrimination good, but this is at the expense of high intrinsic loss for the oscillating modes, making such cavities suitable only for lasers with high gain.

A major advance to overcome such problems was the introduction of so-called graded-phase mirrors [2, 3]. It was shown that a resonator with graded-phase mirrors could discriminate against undesired modes by altering the generalised radius of curvature of the incoming beam according to [2]:

$$\frac{1}{R_2} = \frac{1}{R_1} - \frac{\int_{-\infty}^{\infty} x \left(\frac{d\phi_M}{dx}\right) \psi_1^2(x) dx}{\int_{-\infty}^{\infty} x^2 \psi_1^2(x) dx}, \quad (14)$$

where $R_1$ and $R_2$ are the generalised radii of curvature just prior and just after the graded-phase mirror ($\phi_M$) respectively. Equation (14) indicates that the real radius of curvature of the beam is changed by the phase function of the graded-phase mirror, and moreover, this change is dependent on the incoming amplitude of the field, $\psi_1(x)$. In other words, it is possible for such a graded-phase mirror to discriminate against modes that do not have the proper distribution, $\psi_1(x)$. However, when the graded-phase mirror is spherical (assuming the paraxial limit), the change in curvature of the beam becomes independent of the incoming amplitude of the field, $\psi_1(x)$, since the derivative in the integrand becomes proportional to x.

Unfortunately, for Gaussian beams the required graded-phase mirror surface is spherical, therefore annulling the aforementioned discrimination process. To put this another way, the graded-phase mirror approach cannot be used to select between any of the Hermite-Gaussian (in resonators with rectangular symmetry) or Laguerre-Gaussian (in resonators with circular symmetry) modes, and therefore by definition not the lowest order Gaussian mode either. The reason is simply that under free space propagation all such fields have an identical real radius of curvature, defined by spherical wavefronts, and thus reverse propagating such beams to find the appropriate conjugate always returns a solution that requires a spherical curvature mirror.

It will be noted that the form of the graded-phase mirror may in fact be a deformable mirror, a diffractive mirror, or approximated by a transmission diffractive optical element or even an intra-cavity phase-only spatial light modulator. The limitation is not in how the phase element is implemented, but rather by the fundamental physics governing the propagation of Gaussian beams.

It is however possible to overcome this problem by metamorphosing a Gaussian beam into another desired shape. Since the resulting propagation will not follow that of a Gaussian beam in free space, the resulting beam after propagation may be discriminated against in the usual manner. In accordance with the invention, the optical resonator 100 produces a Gaussian mode beam 108 using diffractive optical elements by intra-cavity metamorphosis of a Gaussian beam 108 at the output coupler end, to a flat-top beam at the opposite end of the optical cavity 102. It is known that flat-top beams have been favoured over Gaussian beams in those applications where high power extract is required [5]. This is because flat-top beams enjoy a larger mode volume for the same Gaussian beam size, and they overcome the poor saturation and energy extraction at the edge of Gaussian beams. Such a resonator has the possibility of low diffraction loss, and high energy extraction, while producing a low divergence Gaussian beam.

Reference is again made to FIG. 1, a flat-flat resonator is modified with suitable intra-cavity diffractive optical elements 104.1, 104.2, where the sum of the flat mirror 106.1, 106.2 and adjacent transmission DOE 104.1, 104.2 mimics a graded-phase mirror. The functional form of the two DOEs 104.1, 104.2 must then be outlined. To do this, a circular Gaussian field at mirror $M_1$ of the form $u_1(\rho)=\exp[-(\rho/w_0)^2]$ is considered, where $w_0$ is the radius where the field is at 1/e of its peak value. If the DOE 104.1 at mirror $M_1$ 106.1 is made up of a Fourier transforming lens and a phase only transmission element, $\phi_{SF}$, and the resonator length (L) is selected to match the focal length of the Fourier transforming lens (L=f), then the resulting field at mirror $M_2$ 106.2 will be given by:

$$u_2(r) = i\frac{k}{f}\exp(ikf)\exp\left(\frac{ikr^2}{2f}\right)\int_0^\infty u_1(\rho)\exp[i\phi_{SF}(\rho)]J_0\left(\frac{kr\rho}{f}\right)\rho d\rho. \quad (15)$$

The method of stationary phase may then be applied to find an analytical solution for the phase function $\phi_{SF}$, such that the field $u_2$ is a perfect flat-top beam, of width $w_{FTB}$ [12]:

$$\phi_{SF}(\rho) = \beta\frac{\sqrt{\pi}}{2}\int_0^{\frac{\rho}{w_0}}\sqrt{1-\exp(-\xi^2)}\,d\xi, \quad (16)$$

where a dimensionless parameter $\beta$ has been introduced, defined as $$\beta = \frac{2\pi w_0 w_{FTB}}{f\lambda}. \quad (17)$$

Since the flat-top beam is generated only at the Fourier plane of the lens, the effective phase profile of the DOE 104.1 at mirror $M_1$ 106.1 mimicking both the lens and this element is given by:

$$\phi_{DOE_1}(\rho) = \phi_{SF}(\rho) - \frac{k\rho^2}{2f}, \quad (18)$$

where the second term is the required Fourier transforming lens. In addition to an exact function for the phase of the first DOE 104.1, it is submitted that it is also possible to use the stationary phase method to extract a closed form solution for the phase of the DOE 104.2 at mirror $M_2$ 106.2 as:

$$\phi_{DOE_2}(r) = \arg\left\{\exp\left[i\left(\frac{k}{2f}r^2 + \phi_{SF}(\rho(r)) - \frac{\beta r\rho(r)}{w_{FTB}w_0}\right)\right]\right\}, \quad (19a)$$

where from the stationary phase condition $r/w_{FTB}=\partial\phi_{SF}/\partial\rho$ we may find the unknown function:

$$\rho(r) = w_0\sqrt{-\ln\left[1-\left(\frac{2r}{\sqrt{\pi}\,w_{FTB}}\right)^2\right]}, \quad (19b)$$

Such a mirror will reproduce the present Gaussian field with a flat wavefront at mirror $M_1$ 106.1, as desired. Moreover, since the field at mirror $M_2$ 106.2 is a flat-top beam, there exists the possibility for uniform gain saturation and high energy extraction if the gain medium 110 is placed at this end of the resonator cavity 102.

It is instructive to consider the flat-top beam as a Flattened Gaussian Beam (FGB) of order N [10]. The advantage of this profile over others is that it offers a simple analytical expression for the beam profile at any propagation distance z, and furthermore, the Gaussian and flat-top profiles are returned when N=1 and N→∞ respectively. It is known that flat-top beams are able to fill a larger mode volume without the adverse affects of diffraction for similar sized Gaussian beams, due to the fast drop in intensity at the edges of the beam. In fact, it has been pointed out [17] that even a relatively low order FGB fills nearly four times more volume of a laser rod of diameter $d=3w_0$ than a Gaussian beam could, due to the smaller Gaussian field required in order to avoid hard edge clipping. In addition, the peak intensity of the FGB is smaller than that of a Gaussian beam of the same width and energy, reaching a minimum of only half the peak intensity when the order N>>1. This is important when considering practical issues such as thermally induced stress fracture, and thermal aberrations, in solid state gain materials. However, the disadvantage of such beams is the larger beam quality factor, and hence shorter Rayleigh range, thus reducing the useful length of the gain medium that will experience the uniform beam. The Rayleigh range of such a beam is given by $z_R/N$ where $z_R$ is the Rayleigh range of a Gaussian beam with the same parameters [10]. The price to be paid for a perfect flat-top beam (N>100) is a significantly reduced Rayleigh range. These results are important in understanding the depth of field of the flat-top beam for gain extraction purposes.

In the present invention, these points may be balanced through the use of Eq. (17); herein lies the salient parameters of the desired Gaussian beam size, the desired flat-top beam size, and the degree of flatness of the beam itself, $\beta$, which is proportional to the order of the FGB. If all three are to be chosen independently for a particular wavelength, then the focal length of the Fourier transforming lens, and hence the length of the optical resonator 100, must be appropriately selected using Eq. (17), while the phase functions of the DOEs 104.1, 104.2 maintain the same functional form, i.e., only the dimensionless parameter $\beta$ changes in the equations. The ease with which the DOEs 104.1, 104.2 may be calculated for various parameters of the desired mode is a unique feature of this optical resonator 100 design. Essentially the propagation of the Gaussian beam outside the optical resonator 100 may be determined almost independently of the flat-top mode inside the gain volume. There are advantages to such a flexible design.

To expound on the concept, the example of a resonator designed to produce a Gaussian beam with a width of $w_0=1$ mm is considered, from which the required Gaussian beam half angle divergence of $\theta=\lambda/\pi w_0=0.34$ mrad ($\lambda=1064$ nm) can be deduced. With this fixed, any two of the remaining three parameters may be selected: resonator length (L), flat-top beam size, or degree of flatness of our flat-top beam ($\beta$). If the gain medium 110 is a rod of radius 3 mm and length 100 mm, a flat-top beam of $w_{FTB}=2$ mm may be selected, while $\beta=23$ will ensure a high fidelity flat-top beam that propagates throughout the gain length without significant changes. From Eq. (17), it can be deduced that the required resonator length (L=f) is given by ~500 mm.

Figure 8:
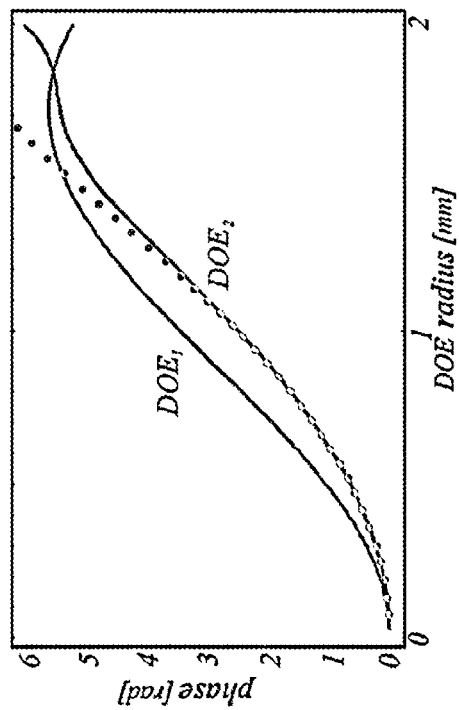
FIGS. 7 and 8 show graphs of the results of a numerical simulation of the optical resonator of FIG. 1.
Figure 7:
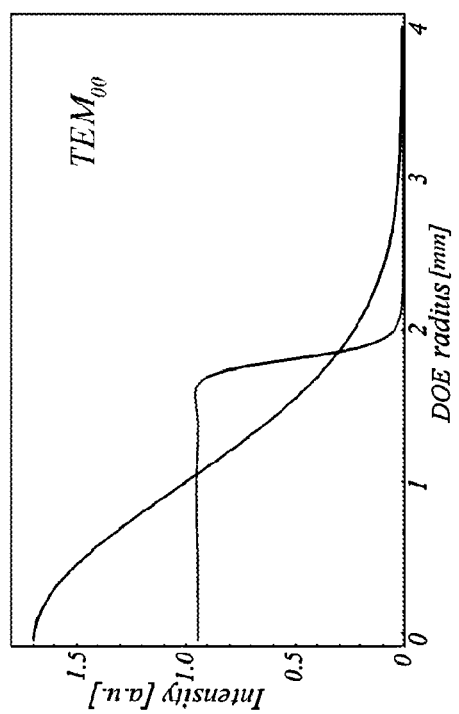

FIGS. 7 and 8 show the results of a numerical simulation of the optical resonator 100, starting with a field of random noise and propagated following the Fox-Li approach [7] until stability, with mirror radii of $4w_0$. FIG. 7 shows the stable fields at either end of the optical resonator 100—the expected Gaussian and flat-top beams as per the design. FIG. 8 shows the numerically determined phase of each DOE 104.1, 104.2. Near the edge of the beam 108 there is a slight discrepancy between the analytically calculated phase of the second DOE 104.2 and the numerically determined phase; this is due to the use of the stationary phase approximation in the analytical equations. The same design procedure may be adopted to accommodate other constraints, for example, the length of the resonator 100 or the complexity of the DOEs 104.1, 104.2 themselves.

Figure 9:
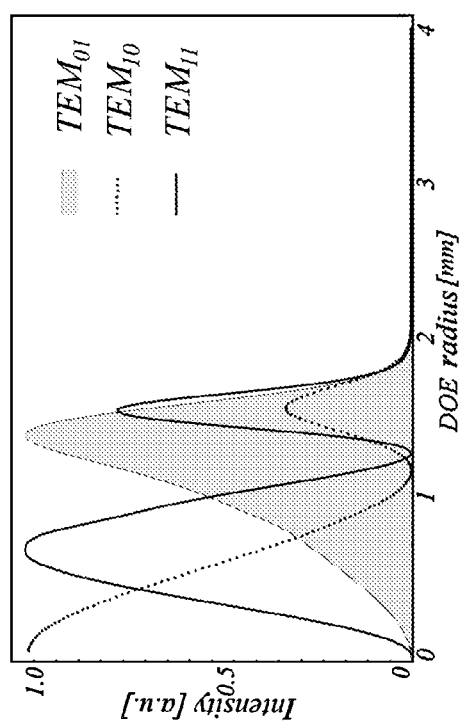
FIG. 9 shows cross-sections of first three higher-order competing modes of the beam generated by the optical resonator of FIG. 1.

It is also instructive to extend the example above to consider the mode discrimination of this optical resonator 100. Without any gain considerations, the fundamental Gaussian/flat-top mode has the lowest loss (0.34%) with the next lowest loss modes shown in FIG. 9, at mirror $M_2$ 106.2. These three modes have higher losses, by factors of 1.06 ($TEM_{10}$), 1.18 ($TEM_{01}$) and 1.47 ($TEM_{11}$) respectively, but also have significantly smaller mode volumes within the gain region 110, decreased relative to the fundamental mode by a factor of 0.65 ($TEM_{10}$), 0.29 ($TEM_{01}$) and 0.33 ($TEM_{11}$) respectively.

Thus when gain is included (at the flat-top end), the significantly increased volume for our Gaussian/flat-top mode should aid mode discrimination, whereas in conventional resonator designs it is often the reverse: the Gaussian mode would have a lower mode volume than other competing modes. In a practical system the discrimination could be further enhanced by the inclusion of suitable apertures on the Gaussian end of the resonator.

The Inventors believe that the invention as exemplified provides a laser and method of creating a flat-top beam an as the output mode having analytical expressions for the required mirror surfaces, e.g. in the form of graded-phase mirrors. A suitable diffractive optical element converts a Gaussian beam into a flat-top beam at the Fourier plane of a lens. This method shows fast convergence and relatively low round trip loss for the fundamental mode of the optical resonator 102. A particularly useful feature of this optical resonator 100 is its ability to generate a Gaussian field with planar wavefront that is selected by phase-only intra-cavity elements.

Further, a laser beam generated in accordance with the invention changes between a Gaussian beam and a flat-top beam during propagation from one end of the optical resonator 100 to the other. By placing the gain medium at the flat-top beam end, it is possible to extract high energy, in a low-loss cavity. A further feature of this optical resonator 100 is the ability to select the field properties at either end of the cavity almost independently, thus opening the way to minimise the output divergence while simultaneously maximising the output energy.

The metamorphosis from one beam shape to another is achieved through phase-only optical elements. Such a configuration lends itself to high energy extraction with good competing mode discrimination in a low divergence output mode.

REFERENCES

1. Laser Beam Shaping, Theory and Techniques, ed Dickey/Holswade. (New York: Marcel Dekker, Inc.) (2000)
2. P. A. Belanger P. A., C. Pare, "Optical resonators using graded-phase mirrors" Opt. Lett. 16, 1057-1059 (1991)
3. C. Pare, P. A. Belanger, "Custom Laser Resonators Using Graded-Phase Mirror" IEEE J. of Quantum Electron. 28, 355-362 (1992)
4. P. A. Belanger, R. L. Lachance, C. Pare, "Super-Gaussian output from a $CO_2$ laser by using a graded-phase mirror resonator" Opt. Lett. 17, 739-741 (1992)
5. J. R. Leger, D. Chen, Z. Wang, "Diffractive optical element for mode shaping of a Nd:YAG lase" Opt. Lett. 19, 108-110 (1994)
6. J. R. Leger, D. Chen, K. Dai, "High modal discrimination in a Nd:YAG laser resonator with internal phase gratings" Opt. Lett. 19, 1976-1978 (1994)
7. A. G. Fox and T. Li, "Resonant Modes in a Maser Interferometer" Bell Syst. Tech. J. 40, 453-488 (1961)
8. D. L. Shealy, J. A. Hoffnagle, "Laser beam shaping profiles and propagation" Appl. Opt. 45, 5118-5131 (2006)
9. Forbes A., Strydom H. J., Botha L. R., and Ronander E., "Beam delivery for stable isotope separation," Proc. SPIE 4770, 13-27 (2002)
10. F. Gori, "Flattened Gaussian beams" Opt. Commun. 107, 335-341 (1994)
11. B. Lu, S. Luo, "General propagation equation of flattened Gaussian beams" J. Opt. Soc. Am. A 17, 2001-2004 (2000)
12. L. A. Romero, F. M. Dickey, "Lossless laser beam shaping" J. Opt. Soc. Am. A 13, 751-760 (1996)
13. F. M. Dickey, S. C. Holswade, "Gaussian laser beam profile shaping" Opt. Eng. 35, 3285-3295 (1996)
14. I. A. Litvin, A. Forbes, "Gaussian mode selection by phase-only elements" submitted to Opt. Lett.
15. L. Burger, A. Forbes, "Kaleidoscope modes in large aperture Porro prism resonators" Opt. Express 16, 12707-12714 (2008)
16. S. A. Collins, "Lens-System Diffraction Integral Written in Terms of Matrix Optics" J. Opt. Soc. Am. A 60, 1168-1177 (1970)
17. A. E. Siegman, *Lasers* (University Science Books, 1986).

The invention claimed is:

1. An optical resonator comprising:
   an optical cavity and a phase-only optical element defining each end thereof, operable to sustain circulating laser beam therein:
   wherein each phase-only optical element is operable to transform an intensity profile of a stable single mode of the laser beam without changing the mode of the laser beam during propagation along a length of the optical resonator, such that the single-mode laser beam changes its intensity profile continuously in the optical resonator while it circulates back and forth with the intensity profile of the laser beam at a first end of the optical resonator being Gaussian and with the intensity profile at a second end of the optical resonator being non-Gaussian.

2. The optical resonator as claimed in claim 1, wherein the optical resonator includes a gain medium located within the optical cavity and in which the gain medium is arranged more towards one end of the optical resonator.

3. The optical resonator as claimed in claim 2, wherein the gain medium is arranged towards the second end, for higher energy extraction than had the gain medium not been arranged towards the second end.

4. The optical resonator as claimed in claim 1, wherein the optical resonator includes an output coupling at the first end to produce an output laser beam having a Gaussian intensity profile with a lower divergence than had the intensity profile of the laser beam been constant.

5. The optical resonator as claimed in claim 1, wherein the intensity profile at the second end of the optical resonator is a Flat-Top Beam (FTB) profile.

6. A laser apparatus which includes:
the optical resonator as claimed in claim 1; and
associated drive and control circuitry to operate the optical resonator.

7. A method of generating a laser beam inside an optical resonator having a phase-only optical element defining each end thereof and operable to circulate the laser beam therein, the method including:
transforming, by means of the optical elements, an intensity profile of a stable single mode of the laser beam, without changing the mode of the laser beam during propagation along a length of the optical resonator, such that the single-mode laser beam changes its intensity profile continuously in the optical resonator while it circulates back and forth with the intensity profile of the laser beam at a first end of the optical resonator being Gaussian and with the intensity profile at a second end of the optical resonator being non-Gaussian.

8. The optical resonator as claimed in claim 5, wherein the intensity profile of the stable, single-mode laser beam between the first and second ends is a weighted average between Gaussian and Flat-Top Beam (FTB).

\* \* \* \* \*